United States Patent [19]
Marcus

[11] Patent Number: 5,154,658
[45] Date of Patent: Oct. 13, 1992

[54] CHILD'S WALKER TOY

[75] Inventor: Wayne S. Marcus, Providence, R.I.

[73] Assignee: Playskool, Inc., Pawtucket, R.I.

[21] Appl. No.: 748,852

[22] Filed: Aug. 23, 1991

[51] Int. Cl.[5] .................. A63H 5/00; A63H 17/28; A63H 17/08; A63H 33/26
[52] U.S. Cl. .................. 446/411; 446/409; 446/438; 446/432; 446/485
[58] Field of Search ............... 446/411, 410, 409, 404, 446/397, 438, 439, 437, 434, 432, 431, 484, 485

[56] References Cited

U.S. PATENT DOCUMENTS

| | | | |
|---|---|---|---|
| D. 281,792 | 12/1985 | Nakao et al. | D21/78 |
| D. 282,087 | 1/1986 | Kassai | D21/78 |
| D. 293,329 | 12/1987 | Nakao et al. | D21/78 |
| D. 302,707 | 8/1989 | Nakao et al. | D21/74 |
| 1,969,407 | 8/1934 | Kingsbury | 446/439 |
| 2,552,288 | 5/1951 | Lee | 84/95 |
| 2,733,548 | 2/1956 | Sebel | 446/189 |
| 2,820,327 | 1/1958 | Charvat | 446/439 |
| 2,849,819 | 9/1958 | Murphy et al. | 446/439 X |
| 4,228,616 | 10/1980 | Wilson | 446/439 |
| 4,282,680 | 8/1981 | Zaruba | 446/485 X |
| 4,693,697 | 9/1987 | Pagano | 446/411 X |
| 4,701,146 | 10/1987 | Swenson | 446/485 X |
| 4,813,907 | 3/1989 | Rissman et al. | 446/438 X |
| 4,889,514 | 12/1989 | Auer et al. | 446/409 X |
| 4,932,913 | 6/1990 | Ravin et al. | 446/404 X |
| 4,946,416 | 8/1990 | Stern et al. | 446/409 |
| 4,964,837 | 10/1990 | Collier | 446/409 |
| 5,030,160 | 7/1991 | Kawitter | 446/439 X |

FOREIGN PATENT DOCUMENTS

| 2026331 | 2/1980 | United Kingdom | 446/439 |
| 2214832 | 9/1989 | United Kingdom | 446/409 |

Primary Examiner—David N. Muir
Attorney, Agent, or Firm—Salter, Michaelson & Benson

[57] ABSTRACT

A child's walker toy includes a walker unit and a sound and light module on the walker unit. The walker unit is operable by a toddler-age child for stabilizing the child during a walking exercise; and the sound and light module is responsive to movement of the walker toy on a supporting surface for producing predetermined sound and light signals.

6 Claims, 2 Drawing Sheets

CHILD'S WALKER TOY

BACKGROUND AND SUMMARY OF THE INVENTION

The instant invention relates to apparatus for toddler-age children, and more particularly to a walker toy for a child which includes a motion responsive signalling unit.

It has generally been found that walker toys can be effectively utilized for aiding young children in the early development of walking skills. In this regard, most of the heretofore available walker toys for children have comprised a base unit which is supported on a plurality of wheels, and a hand rail on the base unit which is positioned so that it can be grasped by a toddler-age child located therebehind for stabilizing the child during a walking exercise. However, it has been found that children often tend to quickly lose interest in walker toys of this type and that as a result, they often prefer to crawl rather than working toward the development of early walking skills.

The instant invention provides an effective walker toy which is adapted to more effectively hold the attention of a young child during a walking exercise. Specifically, the walker toy of the instant invention includes an electronic motion sensor which is responsive to movement of the walker toy on a supporting surface for generating an actuating signal, and an electronic signalling unit which is responsive to the actuating signal from the motion sensor for producing a signal which is detectable by the child during a walking exercise. Still more specifically, the walker toy of the instant invention comprises a walker unit which includes a base, a plurality of wheels for rotatably supporting the base on a supporting surface, and a hand rail on the base which is adapted to be grasped by a toddler-age child for stabilizing the child during walking movement behind the base. The walker toy still further comprises an electronic motion sensor on the walker unit for sensing motion thereof on a supporting surface, and an electronic signalling unit which is responsive to the motion sensor for producing a signal which is detectable by a child during use of the walker toy by the child. The signalling unit preferably comprises audible signalling means which is operative for producing an electronic siren sound in response to motion of the toy on a supporting surface as detected by the motion sensor unit, and a flashing light assembly which is operative in a flashing mode in response to a signal from the motion sensor unit for producing a flashing light signal. The signalling unit is preferably operative for producing sound and light signals for a period of at least approximately five seconds in response to actuation thereof with the motion sensor unit. Further, the walker unit preferably comprises a body portion which is formed in the configuration of a simulated fire engine body, and the signalling unit is preferably operative for producing a siren sound signal and a visible flashing light signal in order to simulate the siren sounds and lights of a fire engine.

It has been found that the walker toy of the instant invention can be effectively utilized for assisting a small child in the early development of his or her walking skills. In this connection, it has been found that because the walker toy includes signalling means which is operative for producing both audible sound signals and flashing light signals in response to motion of the toy on a supporting surface, the walker toy is better able to hold the attention of a young child during a walking exercise. Further, the walker toy has a substantially increased play value and it is operative for encouraging a young child in the early development of his or her walking skills.

Devices representing the closest prior art to the subject invention of which the applicant is aware are disclosed in the U.S. Pat. No. to Kingsbury 1,969,407; Lee U.S. Pat. No. 2,552,288; Sebel U.S. Pat. No. 2,733,548; Charvat U.S. Pat. No. 2,820,327; Wilson U.S. Pat. No. 4,228,616; Nakao et al No. Des.281,792; Kassai No. Des.282,087; Nakao et al No. Des.293,329; and Nakao et al No. Des.302,707. However, while these references disclose a number of toy vehicles, some of which are adapted for use as walker toys, they fail to disclose a walker toy which includes a motion sensor unit and a signalling unit which is responsive to the motion sensor unit for producing an audible signal in the manner of the walker toy of the instant invention. Hence, they are believed to be of only general interest with respect thereto.

Accordingly, it is a primary object of the instant invention to provide a walker toy which can effectively hold the attention of a child during a walking exercise.

Another object of the instant invention is to provide a child's walker toy which is operative for producing audible sounds in response to movement thereof on a supporting surface.

A still further object of the instant invention is to provide a child's walker toy having a signalling unit which is operative for producing sound and light signals for at least a predetermined minimum period of time in response to movement of the walker toy on a supporting surface.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
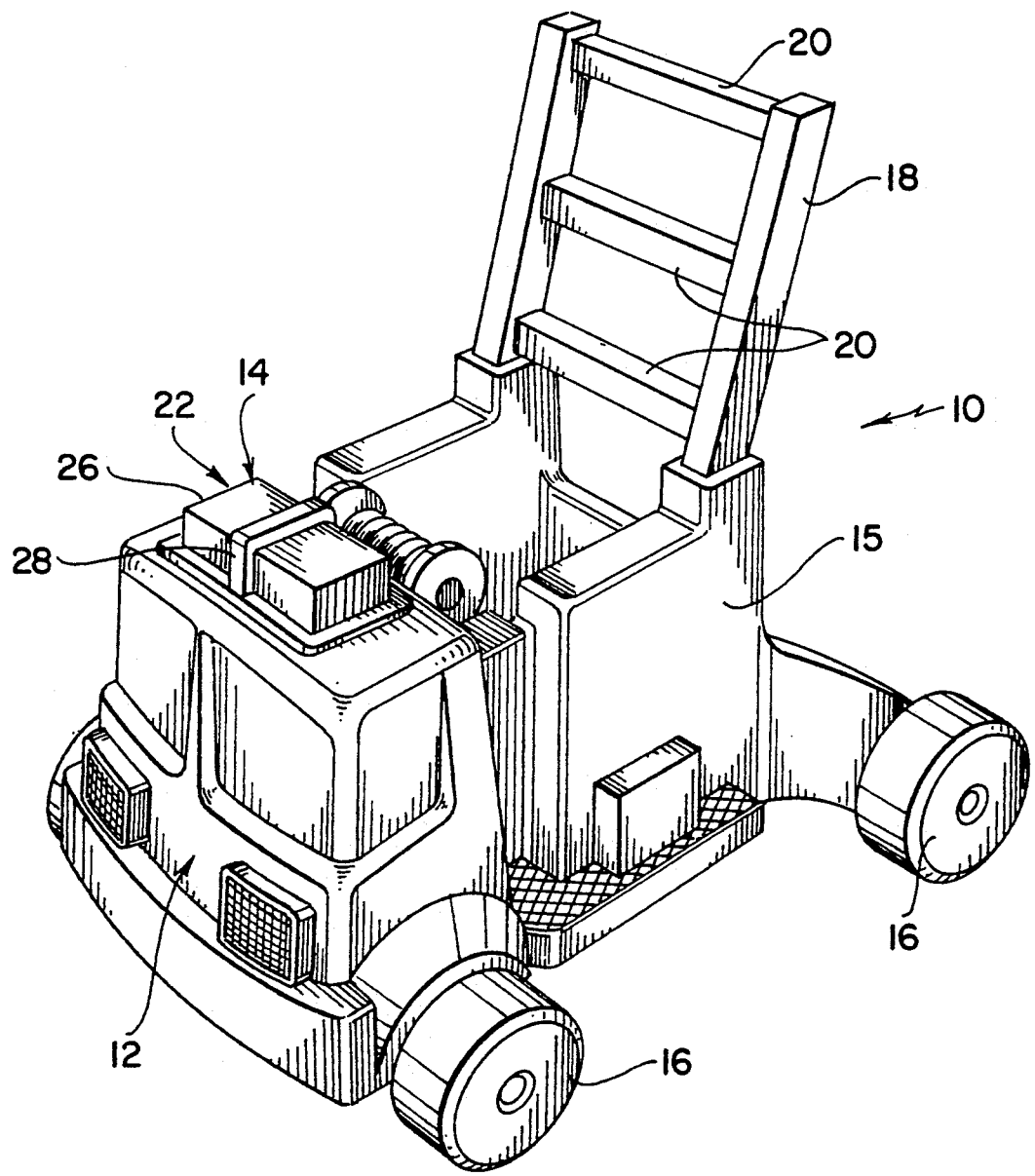
FIG. 1 is a perspective view of the walker toy of the instant invention.

Referring now to the drawings, the walker toy of the instant invention is illustrated and generally indicated at 10 in FIG. 1. The walker toy 10 comprises a walker unit generally indicated at 12, and a sound-and-light module generally indicated at 14 on the walker unit 12. The walker unit 12 is adapted for use in stabilizing a young child during a walking exercise and the sound-and-light module 14 is operative for producing predetermined sound-and-light signals during movement of the walker unit 12 on a supporting surface.

The walker unit 12 comprises a base portion 15, a plurality of rotatable wheels 16, and a handlebar portion 18. The base portion 15 is formed in the configuration of a miniature fire engine, and it is movably supported on the wheels 16. The handlebar assembly 18 extends upwardly from the rear portion of the base portion 15 to enable a toddler-age child to grasp the handlebar unit 18 when the child is positioned behind the walker 10. The handlebar assembly 18 includes a plurality of vertically spaced crossbars 20 which are adapted for receiving the hands of a young child in order to stabilize the child during a walking exercise.

Figure 2:
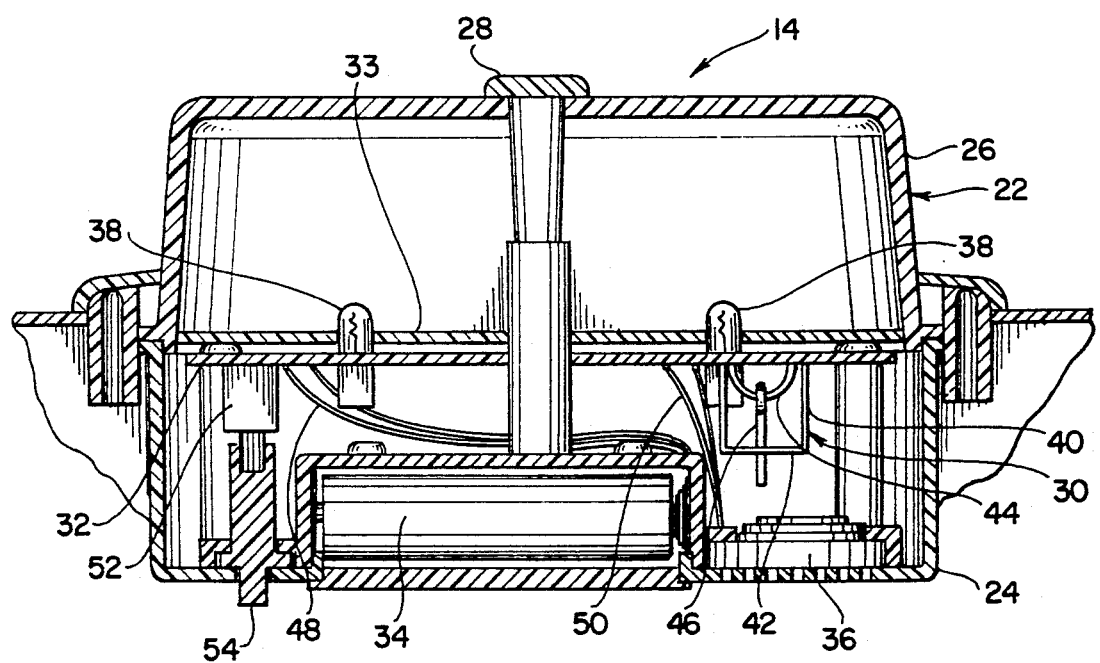
FIG. 2 is a cross-sectional view of the sound-and-light module thereof.

Referring now to FIG. 2, the sound-and-light module 14 is more clearly illustrated. The sound-and-light module 14 comprises a housing generally indicated at 22 including a lower portion 24, an upper portion 26, and a mounting bracket 28. The lower and upper housing portions 24 and 26 are normally maintained in assembled relation and secured to the base 15 with the bracket 28 so that the sound-and-light module 14 is positioned on the upper front portion of the base 15. Also included in the sound-and-light module 14 is a motion sensor switch generally indicated at 30, a circuit board assembly 32, a battery 34, a sound element 36, and a pair of incandescent light bulbs 38. The motion sensor switch 30 is suspended from the underside of the circuit board assembly 32 and it includes a pair of vertically disposed side walls 40 which are joined to a bottom wall 42. The bottom wall 42 has a central aperture (not shown) therein, and the motion sensor switch 30 further comprises a ring element 44 which is also attached to the underside of the circuit board assembly 32. Loosely received on the ring element 44 is an eye member 46, which hangs downwardly from the ring element 44 so that it extends through the center of the aperture (not shown) in the bottom wall 42. The eye member 46 is positioned so that under normal conditions it passes through the center of the aperture (not shown) in the bottom wall 42 and therefor does not contact the bottom wall 42. However, upon movement of the walker toy 10, the eye member 46 is free to swing on the ring element 44 so that the eye member 46 makes electrical contact with the bottom wall 42 to complete an electrical circuit between the ring element 44 and the side walls 40 of the sensor switch 30. The circuit board assembly 32 is of conventional construction and it is electrically connected to both the side walls 40 and the ring member 44 of the sensor switch 30 so that the circuit board assembly 32 is actuated when the eye member 46 contacts the bottom wall 42. The circuit board assembly 32 is electrically connected to the incandescent bulbs 38, and it is electrically connected to the battery 34 through wires 48. The circuit board assembly 32 is electrically connected to the sound element 36 through wires 50, and it includes an on-off switch 52 which is manually operable with a switch extension member 54. The on-off switch 52 preferably comprises a three position switch which is connected in the circuit 32 so that it is operable in an "off" position, a first "on" position wherein both the lights 38 and the sound element 36 are activated when the motion sensor switch 30 is actuated, and a second "on" position wherein only the lights 38 are actuated when the motion sensor switch 30 is actuated. The circuit 32 includes a conventional timer subcircuit for maintaining the circuit board assembly 32 in an actuated condition for at least approximately five seconds once the circuit board assembly 32 has been actuated by the motion sensor switch 30. The sound element 36 is also of conventional construction and it is preferably operative for producing a siren-like sound when it is electrically energized by the circuit board assembly 32. The incandescent light bulbs 38 are also of conventional construction and they are electrically connected to the circuit board assembly 32, as previously stated. Accordingly, during operation of the sound-and-light module 14, whenever the motion sensor switch 30 is actuated so that the eye member 46 contacts the bottom wall 42, the circuit board assembly 32 is actuated to cause the incandescent lights 38 to flash and to cause the sound element 36 to produce a siren-like sound for a period of at least approximately five seconds. Further, as the eye member 46 again contacts the bottom wall 42 the circuit board assembly 32 is re-actuated for an additional period of time so that the sound-and-light module 14 continues to operate as long as there is sufficient movement to cause the eye member 46 to periodically contact the bottom wall 42.

Accordingly, for use and operation of the walker toy 10, a child must grasp one of the crossbars 20 in order to support the child during a walking exercise. As the child moves the walker toy 10 on a supporting surface, the eye member 46 contacts the bottom wall 42 so that the motion sensor switch 30 actuates the circuit board assembly 32. This causes the lights 38 to flash, and the sound element 36 to produce a siren-like sound for a period of at least approximately five seconds. Further, as the child continues to move the walker toy 10 on the supporting surface, the eye member 46 repetitively moves into contact with the bottom wall 42 to maintain the circuit board assembly 32 in an actuated condition until all movement of the toy 10 has ceased.

Accordingly, it is seen that the instant invention provides an effective walker toy for a child. The walker toy 10 includes the sound-and-light module 14 which is operative for flashing the light bulbs 38 and for producing siren-like sounds during movement of the walker toy 10. Accordingly, the walker toy 10 is operative with a substantially increased level of effectiveness for holding the attention of a child during a walking exercise. Hence, it is seen that the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A walker toy for a toddler-age child comprising:
   a. a walker unit including:
      i. A base simulating an emergency vehicle,
      ii. wheel means for rotatably supporting said base on a supporting surface, and
      iii. hand rail means extending upwardly from a rear portion of said base, said hand rail means being adapted to be grasped by a toddler-age child for stabilizing the latter during a walking exercise;
   b. electronic motion sensor means on said walker unit for sensing motion thereof on a supporting surface; and
   c. electronic signalling means mounted on a front portion of said base, said signalling means comprising siren simulating and flashing light means responsive to said motion sensor means for producing a signal which is detectable by a child during walking movement thereof behind said walker unit, said signalling means being operative for producing said signal for a predetermined period of time.

2. In the walker toy of claim 1, said signalling means comprising a flashing light.

3. In the walker toy of claim 1, said signalling means being operative for producing a signal for a period of at least approximately 5 seconds in response to actuation thereof with said motions sensor means.

4. In the walker toy of claim 1, said base further comprising body means simulating a fire engine body.

5. In the walker toy of claim 4, said signalling means comprising means for producing a siren sound, and a flashing light operative simultaneously with said siren sound.

6. A walker toy for a toddler-age child comprising:
   a. a walker unit including;
      i. body means simulating a miniature fire engine, said body means including a front cab section and a rear ladder section, said cab section having windows and a roof portion,
      ii. a plurality of wheels for rotatably supporting said body means on a supporting surface; and
      iii. hand rail means comprising a plurality of vertically spaced crossbars which simulate the ladder of a fire engine, said hand rail means extending upwardly from said rear ladder section and being adapted to receive the hands of a toddler-age child for stabilizing the latter during a walking exercise;
   b. electronic motion sensor means on said walker unit for sensing motion thereof on a supporting surface; and
   c. electronic signalling means responsive to said motion sensor means, said signalling means comprising a signalling unit having means for simultaneously producing a siren sound and a flashing light for a period of at least approximately 5 seconds in response to actuation thereof with said motion sensor means, said signalling unit being mounted on said roof portion of said cab section so as to simulate the siren and flashing lights of a real fire engine.

* * * * *